United States Patent

[11] 3,625,825

[72] Inventors Hiroshi Shibai;
Akira Hama, both of Kanagawa-ken; Akio Yamanoi, Tokyo; Teruo Shiro, Kanagawa-ken; Kazumoto Kinoshita, Tokyo, all of Japan
[21] Appl. No. 788,913
[22] Filed Jan. 3, 1969
[45] Patented Dec. 7, 1971
[73] Assignee Ajinomoto Co., Inc.
Tokyo, Japan
[32] Priorities June 11, 1965
[33] Japan
[31] 40/34332;
June 11, 1965, Japan, No. 40/34333; June 27, 1966, Japan, No. 41/41685
Continuation of application Ser. No. 648,970, June 26, 1967, now abandoned, Continuation-in-part of application Ser. No. 554,322, June 1, 1966, now abandoned.
This application Jan. 3, 1969, Ser. No. 788,913

[54] METHOD OF PRODUCING NUCLEOSIDES BY FERMENTATION
7 Claims, No Drawings
[52] U.S. Cl. ................................................ 195/28, 195/100
[51] Int. Cl. ........................................... C12d 13/06
[50] Field of Search ...................................... 195/28 N

[56] References Cited
UNITED STATES PATENTS
3,111,459 11/1963 Motozaki et al. ............. 195/28 N
3,222,257 12/1965 Shiro et al. .................... 195/28 N Primary Examiner—Alvin E. Tanenholtz
Attorney—Kurt Kelman ABSTRACT: All strains of *Bacillus subtilis* which produce inosine or guanosine by fermentation give higher yields of these nucleosides when the culture medium contains potassium, magnesium, or calcium ions in much higher concentrations than were commonly employed heretofore.

METHOD OF PRODUCING NUCLEOSIDES BY FERMENTATION

The present invention relates to a method of producing nucleosides by fermentation, more particularly to a method of producing inosine and/or guanosine.

Disodium inosine-5'-monophosphate and disodium guanosine-5'-monophosphate have lately been used as seasoning materials in large amounts. They may be produced by chemically or bichemically phosphorylating the corresponding nucleosides which are available by fermentation or by chemical synthesis.

Conventional nucleoside fermentation is carried out by culturing a strain of bacteria capable of producing the nucleoside on a nutrient medium containing an assimilable carbon source, such as glucose; a nitrogen source, such as ammonium salts, nitrates or urea; one or more organic nutrients, such as amino acids, vitamins, adenine or a derivative thereof; and small amounts of inorganic nutrients, such as potassium dihydrogen phosphate, magnesium sulfate or ferrous sulfate, and by recovering the nucleoside produced and accumulated in the cultured broth.

An object of the present invention is to produce nucleosides in high yield by fermentation.

We have found that inosine and guanosine can be produced in very high yield when the nucleoside fermentation is carried out in a medium containing higher concentrations of potassium ions, magnesium ions or calcium ions than were used heretofore.

Potassium ion is necessary for the production of a nucleoside as well as essential for the growth of the micro-organism. When inosine fermentations were carried out in media containing varying amounts of potassium ions, the yields listed in the following table 1 were obtained.

Table 1

| Amount of KCl as K ion (mg./dl.) | Amount of inosine produced (g./l.) |
|---|---|
| 0 | 0.7 |
| 8 | 2.1 |
| 16 | 7.8 |
| 26 | 9.2 |
| 52 | 9.3 |
| 524 | 11.0 |
| 790 | 11.2 |
| 1,050 | 12.6 |
| 1,320 | 12.7 |
| 1,570 | 10.7 |
| 1,350* | 11.1 |

*$KNO_3$ was used.

Each 20 ml. batch of the medium employed contained

| | |
|---|---|
| Starch hydrolyzate (as glucose) | 8 (g./dl.) |
| $(NH_4)_2HPO_4$ | 0.08 |
| $MgSO_4 \cdot 7H_2O$ | 0.04 |
| $FeSO_4 \cdot 7H_2O$ | 0.001 |
| $MnSO_4 \cdot 4H_2O$ | 0.001 |
| Casein hydrolyzate | 0.3 |
| Ribonucleic acid | 0.2 |
| $NH_4CL$ | 1.5 |
| KCL | as listed in table 1 |

The several batches were placed in 500 ml. shaking flasks, sterilized at 110° C. for 10 minutes in an autoclave, and sterile $CaCO_3$ was added to a concentration of 2.5 percent. The media were inoculated with *Bacillus subtilis* M-582-R (ATCC No. 13953), cultured at 30° C. for 70 hours, and the amount of inosine produced was determined.

As is seen from the above table 1, the amount of inosine produced increases as the potassium ion increases to about 25 mg./dl., similar yields of inosine are obtained with 25 to 50 mg./dl. $K^+A$ while conventional inosine fermentation medium contains about 10 to 20 mg./dl. of potassium ions. When about 500 to 2,500 mg./dl. of potassium ions are present, inosine is produced in a very high yield.

Analogous fermentations were performed with *Bacillus subtilis* ATCC No. 19222 which is capable of producing guanosine, and the results listed in the following table 2 were obtained.

Table 2

| Concentration of KCl, as K ions (mg./dl.) | Amount of guanosine produced (g./l.) |
|---|---|
| 20 | 3.0 |
| 360 | 3.1 |
| 500 | 3.1 |
| 650 | 4.6 |
| 730 | 4.5 |
| 1,100 | 4.8 |

The medium contained, in g./dl.:

| | |
|---|---|
| Starch hydrolyzate (calculated as glucose) | 8 |
| $(NH_4)_2HPO_4$ | 0.05 |
| $MgSO_4 \cdot 7H_2O$ | 0.04 |
| $FeSO_4 \cdot 7H_2O$ | 0.001 |
| $MnSO_4 \cdot 4H_2O$ | 0.001 |
| Soybean protein hydrolyzate | 4 |
| Ribonucleic acid (80 percent purity) | 0.08 |
| KCl | as indicated in table 2 |

Fourteen liter batches were placed in jar fermentors, sterilized at 115° C. for 15 minutes with steam, and inoculated with *Bacillus subtilis* ATCC 19222. The media were cultured at 34° C. for 68 hours with stirring and aerating. The pH of the media was maintained at 6.5 by introducing gaseous ammonia during the fermentation.

As can be seen from the above table 2, substantially similar guanosine yields were obtained in media containing 360 to 500 mg./dl. of potassium ions and in the medium containing the conventional 20 mg./dl. of potassium ions. However, when more than about 650 and up to 2,000 mg./dl. of potassium ions are present, guanosine is produced in a very high yield.

The potassium ions may be introduced into the medium by adding potassium hydroxide or in the form of potassium salts, such as potassium chloride, potassium nitrate or potassium phosphate. A relatively high concentration of phosphate ions in the medium results in a decrease in the nucleoside production, and potassium dihydrogen phosphate is preferably used in a concentration of not more than 100 mg./dl. and supplemented by other potassium salts.

Magnesium ions are essential for the growth of the microoragnism, but only in a very small amount. When 100 times the amount of magnesium required for growth is present in the culture medium, the inosine production may be markedly increased. As is shown in table 9 of example 3, a substantial growth of micro-organisms can be obtained with a magnesium ion concentration of 4 mg./dl. About 30 to 40 mg./dl. of magnesium ions are used in conventional inosine fermentation. We have found that inosine can be produced in a very high yield in a medium containing more than about 400 mg./dl. magnesium ions.

Similar results were obtained in guanosine fermentation, which was carried out in the same way as described above with reference to table 2, and are listed in the following table 3. Guanosine can be produced in very high yield in a medium containing magnesium ions in a concentration of more than about 230 and up to 800 mg./dl.

Table 3

| Concentration of $MgCl_2$ as Mg ions (mg.²/dl.) | Amount of guanosine produced (g/l.) |
|---|---|
| 40 | 3.0 |
| 110 | 3.1 |
| 200 | 3.3 |
| 230 | 4.9 |

Magnesium ions may be added to the culture medium in the form of the magnesium salts, such as magnesium sulfate or magnesium chloride.

We have found that the nucleoside production can be greatly increased by elevated concentrations of calcium ions in a culture medium in which a strain of Bacillus subtilis capable of producing nucleoside is cultured on a carbon source, nitrogen source and other nutrients while the medium is being neutralized and the nitrogen source supplemented by gaseous ammonia or ammonia water during the fermentation.

The following table 4 lists the results of experiments on 15-liter batches of a medium containing:

Starch hydrolyzate (as glucose) 8 (g./dl.)
$KH_2PO_4$         0.08
$FeSO_4 \cdot 7H_2$   0.001
$MgSO_4 \cdot 4H_2$   0.001
adenine            0.035
soybean protein hydrolzate  1
$NH_4CL$   as listed in table 4
$CaCl_2$   as listed in table 4
pH         7.5

Each batch was placed in a 20-liter fermentor, adjusted to pH 6.5 by gaseous ammonia introduced with air, inoculated with the inosine producing bacterium Bacillus subtilis C-30-S (ATCC 13954), and cultured at 30° C. for 60 hours with stirring and aeration, while the pH of the medium was maintained at 6.5 by gaseous ammonia. The amount of inosine produced in each fermentor was determined and is listed in the following table 4.

TABLE 4

| Amount of $CaCl_2 \cdot 2H_2O$ as $Ca^{++}$ (g./l.) | Amount of $NH_4Cl$ added— | | | | | |
|---|---|---|---|---|---|---|
| | 0 g./l. | | 10 g./l. | | 15 g./l. | |
| | Total Cl- (g./dl.) | IN (g./l.) | Total Cl- (g./dl.) | IN (g./l.) | Total Cl- (g./dl.) | IN (g./l.) |
| 0 | 0 | 6.3 | | | 0.99 | 8.0 |
| 3 | | | 0.81 | 11.0 | 1.14 | 9.5 |
| 9 | 0.44 | 8.5 | 1.10 | 10.9 | | |
| 17 | 0.82 | 11.6 | | | | |

NOTE.—IN: Amount of inosine produced.

Certain strains of Bacillus subtilis capable of producing inosine require chlorine ion for producing inosine, and accordingly ammonium chloride is used as a nitrogen source. Chlorine ions in the medium damage the apparatus. As is seen from table 4, the amount of chloride ion necessary for inosine production can be decreased by the presence of calcium ion in the medium.

In order to obtain high yields of inosine, calcium ions should be present in a concentration of more than g./dl.

The following table 5 lists the results of experiments on media containing various amounts of calcium ions, and otherwise identical with those described with reference to table 2.

Table 5

| Concentration of $CaCl_2$ as Ca ions (mg./dl.²) | Amount of guanosine produced (g./l.) |
|---|---|
| 187 | 3.2 |
| 350 | 3.4 |
| 374 | 4.3 |
| 547 | 4.8 |

As can be seen from the above table 5, in order to obtain a high yield of guanosine, calcium ions should be present in the medium in a concentration of more than about 370 mg./dl.

As can further be seen from the following table 6, the amount of chlorine ions necessary for satisfactory guanosine production can be reduced by the presence of calcium ions in the medium.

Table 6

| Amount of $NH_4CL$ added (g./dl.) | Amount of $CaCl_2 \cdot 2H_2O$ added (g./dl.) | Amount of guanosine produced (g./l.) |
|---|---|---|
| 1.5 | 0 | 3.7 |
| 1.0 | 0.688 | 4.2 |
| 0.75 | 1.302 | 4.7 |
| 0.50 | 1.372 | 5.7 |
| 0.30 | 1.65 | 4.8 |
| 0 | 2.06 | 4.6 |

Micro-organisms which can be used in the present invention include Bacillus subtilis strains ATCC 19221, ATCC 19222, ATCC 13952, ATCC 13952 (M-582-R), ATCC 13954 (C-30-S), ATCC 13955 and ATCC 13956 (C-30). All members of the species Bacillus subtilis which produce inosine, guanosine or inosine and guanosine were found to give better inosine, guanosine or inosine and guanosine yields with higher concentrations of potassium, magnesium and/or calcium ions than with the amounts of these ions generally used heretofore.

The following examples further illustrate the invention.

EXAMPLE 1

Several batches of a culture medium containing 8 g./dl. of glucose, 0.08 g./dl. of diammonium hydrogen phosphate, 0.001 g./dl. of ferrous sulfate-heptahydrate, 0.001 g./dl. of manganese sulfate-tetrahydrate, 0.3 g./dl. of casein hydrolyzate, 0.03 g./dl. of adenine, 1.5 g./dl. of ammonium chloride and potassium chloride as listed below were adjusted to pH 7.2 with ammonia water, and each 20 ml. batch of the medium was poured onto a 500 ml. shaking flask. Each batch was sterilized at 110° C. for 10 minutes in an autoclave, and calcium carbonate which had previously been sterilized was added to a concentration of 2.5 g./dl. The batches were inoculated with Bacillus subtilis M-582-R (ATCC No. 13953), cultured at 30° C. for 72 or 94 hours, and inosine was produced as listed in table 7.

Table 7

| Amount of KCl added as K ion (mg.ldl.) | Amount of 72 hour's incubation | inosine produced (g.l.) 94 hour's incubation |
|---|---|---|
| 524 | 5.2 | 5.6 |
| 1,050 | 6.0 | 7.7 |
| 1,570 | 7.4 | 8.9 |
| 2,100 | 4.0 | 8.9 |
| 25,620 | 0.3 | 5.2 |

EXAMPLE 2

A stock culture and a seed culture were prepared as follows: Nutrient slants consisting of 1 g./dl. of peptone, 1 g./dl. of yeast extract, 0.3 g./dl. of sodium chloride and potassium chloride as listed in table 8 were prepared, one of the slants was inoculated with Bacillus subtilis C-30 (ATCC 13956) and cultured at 30° C. for 20 hours (stock culture). A fresh culture slant was inoculated from the stock culture, and cultured at 30° C. The culture obtained was inoculated on a fresh culture once more, and a seed culture was prepared.

Bacillus subtilis of the stock culture and the seed culture were inoculated on fermentation media having the same composition as in example 1 but diammonium hydrogen phosphate was replaced by 0.08 g./dl. of potassium dihydrogen phosphate, and the media were cultured at 30° C. for 74 hours with shaking. The results obtained are listed in the following table 8.

Table 8

| Culture slant seeded | $K^+$ concentration in Slant culture (mg./dl.) | Fermentation medium (mg./dl.) | Inosine produced (g./l.) |
|---|---|---|---|
| Stock culture | 0 | 0 | 7.1 |
| Stock culture | 2,100 | 0 | 7.3 |
| Stock culture | 4,200 | 0 | 8.9 |
| Stock culture | 0 | 1,570 | 8.9 |
| Stock culture | 2,100 | 1,570 | 10.5 |
| Stock culture | 4,200 | 1,570 | 10.5 |
| Seed culture | 0 | 0 | 6.9 |
| Seed culture | 2,100 | 0 | 6.7 |
| Seed culture | 4,200 | 0 | 9.3 |
| Seed culture | 0 | 1,570 | 8.0 |
| Seed culture | 2,100 | 1,570 | 8.5 |
| Seed culture | 4,200 | 1,570 | 10.4 |

EXAMPLE 3

A culture medium consisting of:
glucose      7 (g./dl.)
$NH_4CL$     1.5
$KH_2PO_4$   0.08
$FeSO_4 \cdot 4H_2O$   0.001
$MnSO_4 \cdot 4H_2O$   0.001
adenine      0.035
casein hydrolyzate   0.04
$MgSO_4 \cdot 7H_2O$   as listed in table 9
was prepared, the medium was adjusted to 7.4, and 20 ml. batches of the medium were placed in 500 ml. shaking flasks. The media were sterilized at 110° C. for 10 minutes in an autoclave, and 2g./dl. of sterile $CaCO_3$ was added to each medium. The media were inoculated with *Bacillus subtilis* C-30, and cultured at 30° C. for 70 hours with shaking.

Table 9

| Amount of $MgSO_4$ added as $Mg^{++}$ (mg./dl.) | Amount of inosine produced (g./l.) |
|---|---|
| 0 | 0 |
| 40 | 5.2 |
| 100 | 5.8 |
| 400 | 6.4 |
| 1,000 | 7.0 |
| 2,000 | 8.1 |
| 4,000 | 8.8 |
| 6,000 | 9.8 |

EXAMPLE 4

*Bacillus subtilis* C-30 (ATCC 13956) was inoculated on a medium as described with reference to table 4, but $NH_4CL$ was replaced by KCl in the amounts listed in table 10, and the medium was cultured at 30° C. for 65 hours with stirring and aerating. The results obtained are listed in table 10.

TABLE 10

| Amount of $CaCl_2 \cdot 2H_2O$ added (g./l.) | KCl added— | | | | | | | |
|---|---|---|---|---|---|---|---|---|
| | 0g./l. | | 5g./l. | | 10g./l. | | 15g./l. | |
| | Total Cl⁻ (g./dl.) | IN (g./l.) | Total Cl⁻ (g./dl.) | IN (g./l.) | Total Cl⁻ (g./dl.) | IN (g./l.) | Total Cl⁻ (g./dl.) | IN (g./l.) |
| 3 | | | 0.39 | 8.0 | 0.63 | 10.6 | 0.87 | 9.3 |
| 5 | | | | | 0.72 | 10.2 | | |
| 9 | | | 0.68 | 10.9 | 0.92 | 11.3 | | |
| 14 | 0.68 | 10.6 | | | | | | |

NOTE.—IN: Amount of inosine produced.

EXAMPLE 5

Culture media containing
glucose      6 (g./dl.)
$(NH_4)_2HPO_4$   0.05
$MgSO_4 \cdot 7H_2O$   0.04
$FeSO_4 \cdot 7H_2O$   0.001
$MnSO_4 \cdot 4H_2O$   0.001
soybean protein hydrolyzate   1
adenine      0.035
$NH_4CL$     1
KCl      as listed in the table 11 were prepared, each medium was inoculated with *Bacillus subtilis* No. 1346 (ATCC No. 13952), and cultured at 30° C. for 72 and 94 hours in the same procedure as in example 1. The amount of inosine produced is shown in the following table 11.

Table 11

| Amount of KCl added as K ion (mg./dl.) | Amount of inosine produced (g./l.) | |
|---|---|---|
| | 72 hour's incubation | 92 hour's incubation |
| 524 | 2.0 | 2.2 |
| 1,050 | 2.9 | 3.3 |
| 1,570 | 3.5 | 4.7 |
| 2,100 | 3.1 | 4.6 |
| 2,620 | 0.2 | 2.5 |

EXAMPLE 6

A culture medium containing 8 g./dl. of starch acid hydrolyzate (glucose equivalent), 0.05 g./dl. of $KH_2PO_4$, 0.04 g./dl. of $MgSO_4 \cdot 7H_2O$, 0.001 g./dl. of $MnSO_4 \cdot 4H_2O$, 4 g./dl. of soybean protein hydrolyzate, 0.08 g./dl. of ribonucleic acid (80 percent purity) and $NH_4CL$, KCl and $MgCl_2$ as listed in table 12, was prepared, inoculated with *Bacillus subtilis* ATCC 19222, and cultured at 34° C. for 68 hours in a procedure similar to that described in example 1, whereby inosine and guanosine were produced in example 1, whereby inosine and guanosine were produced in the cultured broth as listed in table 12.

Table 12

| Chlorine added | Concentration of CL ion (g./l.) | | | | | |
|---|---|---|---|---|---|---|
| | 3 | | 6.6 | | 9.9 | |
| | IN | GR | IN | GR | In | GR |
| $NH_4cl$ | 10.6 | 3.1 | 10.5 | 3.7 | 9.0 | 4.4 |
| KCl | 10.2 | 3.2 | 11.9 | 4.5 | 12.2 | 4.8 |
| $MgCl_2$ | 12.2 | 3.1 | 12.4 | 4.9 | 13.1 | 4.0 |

IN: Amount of inosine produced (g./l.)
GR: Amount of guanosine produced (g./l.)

EXAMPLE 7

Culture media each containing 8 g./dl. of glucose, 0.05 g./dl. of potassium dihydrogen phosphate, 0.04 g./dl. of magnesium sulfate heptahydrate, 0.001 g./dl. of ferrous sulfate heptahydrate, 0.001 g./dl. of manganese sulfate tetrahydrate, 4 g./dl. of soybean protein hydrolyzate, 0.08 g./dl. of ribonucleic acid (80 percent purity) and 1.3 g./dl. of potassium chloride were prepared, the pH of the media was adjusted to 7.4, and each medium in an amount of 14 litres was poured into 22 litre jar fermentors. Each medium was sterilized at 115° C. for 10 minutes, inoculated with *Bacillus subtilis* ATCC 19222, and cultured at 34° C. for 68 hours with stirring at 600 r.p.m. and with aeration at a rate of 2.6 l/minute. The pH of each medium was maintained at 6.5 throughout the fermentation by ammonia introduced with the air. Guanosine was produced and accumulated to a concentration of 4.6 g./l. in the cultured broth.

EXAMPLE 8

Guanosine was produced by fermentation as in example 7, but potassium chloride was replaced by 2 g./dl. of magnesium chloride hexahydrate, and guanosine was accumulated to a concentration of 5.0 g./l. in the broth during 66 hours of fermentation.

EXAMPLE 9

The potassium chloride was replaced in the procedure of example 7 by calcium chloride dihydrate, the fermentation was performed otherwise in the same way as in example 7 for 66 hours, and 4.8 g./l. of guanosine was produced in the cultured broth.

EXAMPLE 10

The potassium chloride was replaced in the procedure of example 7 by 2.65 g./dl. of calcium chloride dihydrate, and *Bacillus subtilis* ATCC 19222 was replaced by *Bacillus subtilis* ATCC 19221, and the fermentation was performed for 70 guanosine, 6 g./l. of guanosine was produced.

What is claimed is:

1. In a process of fermenting an aqueous medium containing an assimilable carbon source, an assimilable nitrogen source, organic nutrients, and inorganic ions, which comprises inoculating said medium with a strain of *Bacillus subtilis* capable of producing at least one nucleoside of the group consisting of inosine and guanosine, and recovering said nucleoside, the improvement which consists of using an elevated concentration of potassium, magnesium, or calcium ions in said medium,
   a. the elevated concentration of said potassium ions being between 500 and 2,500 mg./dl. if said nucleoside is inosine, and between 650 and 2,00 mg./dl. when said nucleoside is guanosine;
   b. the elevated concentration of said magnesium ions being at least 400 mg./dl. when said nucleoside is inosine, and between 230 and 800 mg./dl. when said nucleoside is quanosine; and
   c. the elevated concentration of said calcium ions being between 1 and 3 g./dl. when said nucleoside is inosine, and between 370 and 1,500 mg./dl. when said nucleoside is guanosine, said elevated concentration of calcium being maintained in said medium substantially from said inoculating to said recovering.

2. In a process as set forth in claim 1, said nucleoside being inosine.

3. In a process as set forth in claim 1, said nucleoside being guanosine.

4. In a process as set forth in claim 1, said strain being a member of the group of strains having ATCC numbers 13952, 13953, 13954, 13955, 13956, 19221 and 19222.

5. In a process as set forth in claim 1, using said elevated concentration of said potassium.

6. In a process as set forth in claim 1, using said elevated concentration of said magnesium.

7. In a process as set forth in claim 1, using said elevated concentration of said calcium, and maintaining said medium at a pH of not substantially less than 6.5 by addition of ammonia during said fermenting.

* * * * *